Jan. 27, 1948.  J. R. BURNS ET AL  2,435,031
DETONATION PICKUP
Filed Feb. 16, 1944
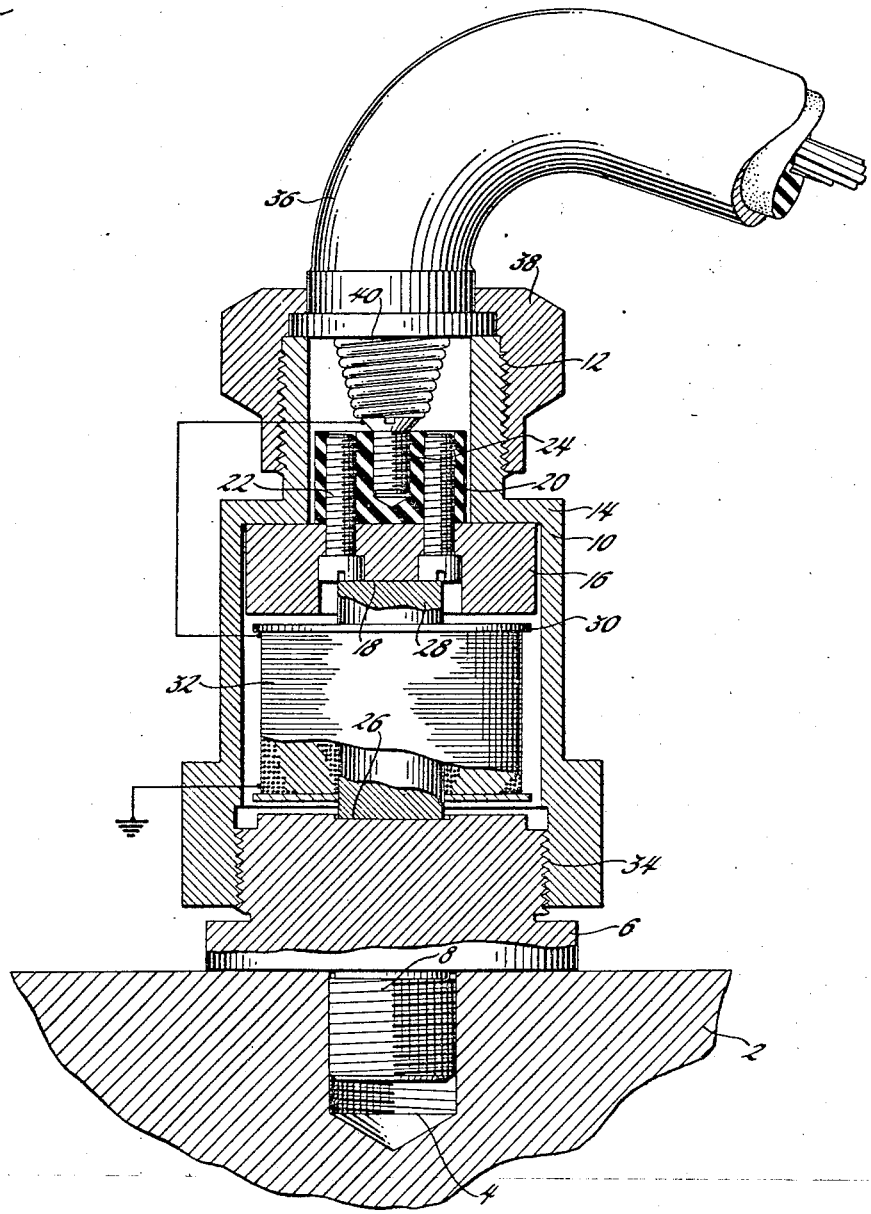
Inventors
John R. Burns &
John M. Whitmore
By Blackmore, Spurrier & Flint
Attorneys Patented Jan. 27, 1948

2,435,031

UNITED STATES PATENT OFFICE 2,435,031

DETONATION PICKUP

John R. Burns and John M. Whitmore, Indianapolis, Ind., assignors to General Motors Corporation, Detroit, Mich., a corporation of Delaware Application February 16, 1944, Serial No. 522,580

5 Claims. (Cl. 171—209)

This invention relates to detecting means and more specifically to pick-up means or means for detecting knock or detonation in a closed engine cylinder through variations in internal pressure therein. It is of course well-known that the explosive mixture within a cylinder upon being fired under certain conditions causes knocks or undesirable pressure increases during certain phases of operation of an internal combustion engine. In some instances with the present high speed and high power engines such knocking or detonation may seriously injure the engine if allowed to continue for even a relatively short time. It is necessary therefore to study knocks or undesirable detonations occurring within the engine cylinder during operation and also to be advised as to the appearance of detonation within the cylinders when an engine is being normally operated under load.

These knocks or detonations of course result in pressure changes within the cylinder and in the past have been studied by providing somewhere in the surface of the cylinder an opening into which was inserted means such as a diaphragm whose position would be altered through a change in internal pressure in the cylinder which movement would be proportional to the pressure causing the knocking and would be detected by suitable means. However, through the use of high compression fuels, such as are prevalent at the present time, the configuration and size of the engine chamber has a great deal to do with flame propagation or explosion therein and any slight variation in either the size or shape of this chamber affects the operation or knock characteristics thereof. Therefore, in order to obtain a detection of this detonation, it is desirable not to disturb the contour or volume of the cylinder if possible.

It is therefore an object of our invention to provide detecting means mountable on the external surface of a cylinder for investigating or indicating internal pressures therein.

It is a further object of our invention to provide detonation detecting means mountable on the external surface of a cylinder and having no moving parts.

It is a still further object of our invention to provide detonation detection means incorporating magneto-stricture means as the sensitive element.

With these and other objects in view which will become apparent as the specification proceeds, the embodiments of our invention will be best understood by reference to the following specification and claims and the illustrations in the accompanying drawings, in which the figure is a vertical section taken through a detector or pick-up device of our invention.

Referring now more specifically thereto, there is shown therein a portion of the cylinder wall 2 which has a tapped opening 4 in the upper surface thereof in which is supported an attaching member 6 by means of an integral threaded stud 8 on the lower surface thereof. The body of this plate is screw-threaded into the lower end of a roughly cylindrical body 10 forming the exterior housing for the detector. Near the upper end of this body it is reduced in diameter to form a shoulder 14 and the upper portion is externally threaded as at 12 to support connecting means.

Within the body 10 there is provided a disc 16 having a cavity 18 in its lower face and supporting upon the central portion of its upper surface an insulating plug 20. This insulating plug is secured to the disc 16 by suitable cap screws 22 and carries at its center an electrical contact 24. The attaching member 6 is also provided with a small recess 26 in its upper surface in substantial alignment with the cavity 18 in the lower surface of the disc 16 and clamped between the two with its ends lying in these recesses is a magneto-strictive member 28 which may be, for example, of such material as Alnico and possesses substantial permanent magnetism. Mounted upon this magnet 28 is a coil form 30 supporting coil 32, one terminal of which may be connected to contact 24 and the other terminal may be grounded. The attaching member 6 therefore may be tightly screwed into the threaded aperture 34 in the lower end of the housing 10 and clamp tightly the magnet 28 in the position shown bringing it under some stress.

One end of a connecting cable 36 is shown clamped to the supper end of the housing 12 by a threaded nut 38 which holds the ring integrel with the end of the cable to the top surface of the housing. A spring contact member 40 is forced against the upper surface of the contact 24 to conduct current into the cable. When this construction is thus mounted on the external surface of a cylinder and vibrations caused by detonation within the cylinder introduced thereinto, these vibrations will cause the stress on the internal magnet member 28 to vary, which will in turn vary the reluctance of this magneto-strictive member, altering the flux therethrough. This variation in flux therefore induces current in the coil, which current is in turn introduced into the connecting cable and may be conducted to suitable indicating means.

This device does not require any external power or energization as is necessary in the majority of other types of detonator pick-up devices, but since the change in reluctance is sufficient, does not need supplemental power. Furthermore, it has no moving parts which might become broken or injured through operation or excessive vibration and is easily and simply constructed and therefore provides a very practical pick-up for this use. In operation the output of this pick-up may be introduced to a meter for accurate observation or may be merely connected to a visual light source which will be energized upon detonation within the cylinder reaching a point where it might be destructive.

We claim:

1. In means for detecting detonation within an engine cylinder, a housing rigidly mounted on the external wall of said cylinder and having a rigid base subject to the vibration thereof, a coil supported within said housing, a magnetic core for said coil securely clamped under compression within the housing on said rigid base and formed of magneto-strictive material so that the reluctance of the same will be varied by vibration and induce detectable current within the coil.

2. The combination of a rigid support adapted to be secured to the exterior surface of a part subject to vibration, a magneto-strictive permanent magnet member of high retentivity seated upon said support, means engaging the opposite end of said member to hold it under compression and in contact with said support and forming with said support and member a closed magnetic circuit, a coil carried by said support and interlinked with the magnetic circuit whereby any change in the reluctance thereof will induce a current in the coil.

3. The combination of a non flexible base adapted to be secured to the exterior surface of a cylinder of an engine, supporting means extending from said base, a magneto-strictive member seated on the base in spaced relation to said supporting means, means engaging said supporting means and said member to hold the member under compression on the base and forming therewith a closed magnetic circuit, the inertia of said parts causing a variation in the stress of the magneto-strictive member when the assembly is vibrated, and a pick-up coil mounted adjacent the member and affected by the varying reluctance caused by stress variation.

4. The combination of a non flexible base adapted to be secured to the exterior surface of a cylinder of an engine, a substantially cylindrical housing supported on said base, a bar of magneto-strictive permanent magnet material seated on the base, a block of magnetizable material engaging the outer end of the bar and the housing to clamp the bar under compression in position and to form with the other members a closed magnetic circuit, a contact block of insulating material carried by the magnetizable block within the housing and a pickup coil connected to the contact block mounted in the housing in juxtaposition to the bar to be affected by a change in reluctance of the bar caused by stress change due to vibration.

5. The combination of a non flexible base adapted to be secured to the exterior surface of a cylinder of an engine said base having threaded sides, a substantially cylindrical housing supported on said base in threaded relation, a bar of magneto-strictive permanent magnet material seated on the base, a block of magnetizable material engaging the outer end of the bar and the housing to clamp the bar under compression in position and to form with the other members a closed magnetic circuit, the initial stress in the bar being adjustable as the housing is screwed onto the base and a pick-up coil mounted around the bar within the housing to be affected by a change in reluctance of the bar caused by a stress change due to vibration.

JOHN R. BURNS.
JOHN M. WHITMORE.

REFERENCES CITED

The following references are of record in the file of this patent:

UNITED STATES PATENTS

| Number | Name | Date |
|---|---|---|
| 2,153,571 | Kallmeyer | Apr. 11, 1939 |
| 2,269,760 | Eldredge | Jan. 13, 1942 |
| 2,291,045 | Lancor | July 28, 1942 |
| 2,275,675 | Draper et al. | Mar. 10, 1942 |